US010683449B2

(12) United States Patent
Lu et al.

(10) Patent No.: US 10,683,449 B2
(45) Date of Patent: Jun. 16, 2020

(54) RHEOLOGY DRILLING FLUID AND METHOD

(71) Applicant: Q'MAX SOLUTIONS INC., Houston, TX (US)

(72) Inventors: Shawn Lu, Katy, TX (US); Jose Perez, Spring, TX (US); Chase M. Brignac, Houston, TX (US); Sanjit Roy, Katy, TX (US)

(73) Assignee: Q'Max Solutions Inc. (CA)

( * ) Notice: Subject to any disclaimer, the term of this patent is extended or adjusted under 35 U.S.C. 154(b) by 220 days.

(21) Appl. No.: 15/893,920

(22) Filed: Feb. 12, 2018

(65) Prior Publication Data

US 2018/0237681 A1 Aug. 23, 2018

Related U.S. Application Data

(60) Provisional application No. 62/458,272, filed on Feb. 13, 2017.

(51) Int. Cl.
*C09K 8/36* (2006.01)

(52) U.S. Cl.
CPC ..................... *C09K 8/36* (2013.01)

(58) Field of Classification Search
CPC . C09K 8/035; C09K 8/12; C09K 8/24; C09K 8/588; C09K 8/882; C09K 8/68; C09K 2208/28; C09K 8/487; C09K 8/5083; C09K 8/528; C09K 8/685; C09K 8/887; C09K 2208/10; C09K 2208/12; C09K 2208/22; C09K 2208/26; C09K 2208/32; C09K 2208/34; C09K 8/032; C09K 8/06; C09K 8/18; C09K 8/20; C09K 8/36; C09K 8/42; C09K 8/467; C09K 8/512; C09K 8/52; C09K 8/605; C09K 8/608; C09K 8/64; C09K 8/80; C09K 8/08; C09K 8/32; C09K 8/46; C09K 8/502; C09K 8/514; C09K 8/5758; C09K 8/90; E21B 7/00; E21B 43/16; E21B 33/13; E21B 43/26; E21B 21/00; E21B 21/003; E21B 33/138; E21B 36/04; E21B 43/2401; E21B 7/14

See application file for complete search history.

(56) References Cited

U.S. PATENT DOCUMENTS

| | | | |
|---|---|---|---|
| 4,816,551 A | 3/1989 | Oehler et al. | |
| 5,189,012 A | 2/1993 | Patel et al. | |
| 5,472,937 A * | 12/1995 | Fleming | C09K 8/36 507/140 |
| 6,887,832 B2 | 5/2005 | Kirsner et al. | |
| 7,278,485 B2 | 10/2007 | Kirsner et al. | |
| 7,435,706 B2 | 10/2008 | Mueller et al. | |
| 7,456,135 B2 | 11/2008 | Kirsner et al. | |
| 7,462,580 B2 | 12/2008 | Kirsner et al. | |
| 7,485,602 B2 | 2/2009 | Kirsner et al. | |
| 7,488,704 B2 | 2/2009 | Kirsner et al. | |
| 7,534,743 B2 | 5/2009 | Kirsner et al. | |
| 7,547,663 B2 | 6/2009 | Kirsner et al. | |
| 7,572,755 B2 | 8/2009 | Miller et al. | |
| 7,638,466 B2 | 12/2009 | Mueller et al. | |
| 7,645,723 B2 | 1/2010 | Kirsner et al. | |
| 7,696,131 B2 | 4/2010 | Oyler et al. | |
| 7,799,742 B2 | 9/2010 | Dino | |
| 7,956,015 B2 | 6/2011 | Dino | |
| 8,138,125 B2 | 3/2012 | Dino | |
| 2005/0049147 A1* | 3/2005 | Patel | C09K 8/36 507/103 |
| 2014/0066341 A1* | 3/2014 | Dino | C09K 8/34 507/131 |
| 2014/0090897 A1* | 4/2014 | Lee | C09K 8/36 175/65 |
| 2014/0262281 A1* | 9/2014 | Kulkarni et al. | C09K 8/02 166/305.1 |
| 2015/0275065 A1* | 10/2015 | Murphy et al. | C09K 8/502 507/125 |
| 2016/0186034 A1* | 6/2016 | Mainye et al. | C09K 8/32 507/103 |

FOREIGN PATENT DOCUMENTS

| | | |
|---|---|---|
| EP | 0229912 A2 | 7/1987 |
| EP | 0403437 A2 | 12/1990 |

OTHER PUBLICATIONS

PCT International Searching Authority/US, International Search Report and Written Opinion of the International Searching Authority, dated Apr. 13, 2018, for PCT/US2018/017827, "Improved Rheology Drilling Fluid and Method."

Shaker, Selim S. "The Deep Water Drilling Tolerance Window: Walking a Fine Line, Case Histories from Gulf of Mexico." AAPG Annual Convention and Exhibition, Houston, TX. Apr. 10-13, 2011; (pp. 1-13).

Lee, J., Friedheim, J., Toups, B., & Van Oort, E. (2004). "A new approach to deepwater drilling using SBM with flat rheology" (pp. 1-13). AADE-04-DF-HO-37.

Mullen, G. A., Tanche-Larsen, P. B., Clark, D. E., & Giles, A. (Apr. 2005). "The pro's and con's of flat rheology drilling fluids." In Proceedings of the AADE 2005 Drilling Fluids Conference, American Association of Drilling Engineers, Houston (pp. 1-16). AADE-05-NTCE-28.

Power, D., & Zamora, M. (Apr. 2003). "Drilling fluid yield stress: measurement techniques for improved understanding of critical drilling fluid parameters." In National Technology Conference "Practical Solutions for Drilling Challenges": American Association of Drilling Engineers, Technical Conference papers, AADE-03-NTCE-35; (pp. 1-9).

(Continued)

*Primary Examiner* — Kumar R Bhushan

(74) *Attorney, Agent, or Firm* — Nielsen IP Law LLC

(57) ABSTRACT

Drilling fluids having improved rheology under downhole temperature and pressure. The improved rheology (IR) drilling fluids are particularly suited for use in deepwater drilling operations. The IR drilling fluids are invert emulsion fluids with viscosifier to rheology modifier weight ratios between about 6 and about 14. The IR drilling fluids exhibit low shear yield point variance and/or yield point variance of below 60 percent based on high-temperature, high-pressure viscometer measurements.

11 Claims, 8 Drawing Sheets

(56) References Cited

OTHER PUBLICATIONS

Hilfiger, M. G., Thaemlitz, C. J., & Moellendick, E. (Sep. 2016). "Investigating the Chemical Nature of Flat Rheology." In SPE Deepwater Drilling and Completions Conference. Society of Petroleum Engineers; (pp. 1-11).
Amani, M. (2012). "The rheological properties of oil-based mud under high pressure and high temperature conditions." Advances in Petroleum Exploration and Development, 3(2), (pp. 21-30).
Cameron, C. (2005). "Deepwater drilling fluids—What's new?" National Technical Conference and Exhibition, American Association of Drilling Engineers. AADE-05-NTCE-79, (pp. 1-6).
Growcock, F. B., & Patel, A. D. (Apr. 2011). "The revolution in non-aqueous drilling fluids." In Proceedings at the 2011 AADE National Technical Conference and Exhibition, Apr. 12-14, 2011, AADE-11-NTCE-33 (pp. 1-8).
Rojas, J. C., et al. (Apr. 2007). "Increased Deepwater Drilling Performance Using Constant Rheology Synthetic-based Mud." AADE-07-NTCE-20, AADE National Technical Conference and Exhibition, Houston, Texas, Apr. 10-12, 2007 (pp. 1-9).
Maxey, J. (Apr. 2006). "Rheological analysis of oilfield drilling fluids." AADE 2006 Drilling Fluids Conference; AADE-06-DF-H0-01 (pp. 1-10).
Leaper, R., et al. (Apr. 2006). "Meeting Deepwater Challenges with High Performance Water Based Mud." AADE 2006 Fluids Conference, Houston, Texas; AADE-06-DF-HO-31 (pp. 1-11).

\* cited by examiner

RHEOLOGY DRILLING FLUID AND METHOD

CROSS-REFERENCE TO RELATED APPLICATION

This application claims the benefit of and priority to U.S. Provisional Patent Application No. 62/458,272 filed on Feb. 13, 2017, which is incorporated herein by reference in its entirety.

BACKGROUND

Drilling fluids (or drilling muds) are used in the process of drilling wellbores. The drilling fluids are circulated through the wellbore during drilling operations to remove cuttings from the wellbore and to lubricate the drill bit. Drilling fluids are also used to maintain a sufficient hydrostatic head in the wellbore to prevent blowouts by balancing the pore pressure of the formation. Many drilling fluids are invert emulsions including a continuous phase formed of a base oil and an internal phase formed of an aqueous solution. Emulsifiers are included in drilling fluids for stabilizing the interface between the continuous phase and the internal phase. Other additives, such as weighting agents, are generally included in drilling fluids.

The rheology of drilling fluids involves an analysis of shear stress, shear rate, and viscosity. Viscosity is defined as the ratio of shear stress to shear rate where shear stress is the force per area (typically expressed in N/m) and the shear rate is the change in velocity over distance. When a fluid begins to flow under the action of a force, a shearing stress opposing the motion arises throughout the fluid. As one layer of fluid moves past an adjacent layer, molecules interact to transmit momentum from the faster layer to the slower layer, thereby resisting the relative motion. Hence, a distinguishing feature of fluids in contrast to solids is the ease with which fluids may be deformed under an applied force. It is the fluid's viscosity that creates resistance to this force. Either shear stress or shear rate must be controlled while the other is measured under well-defined conditions to acquire an accurate viscosity measurement. Viscosity data often functions as a window through which other characteristics of a material may be observed.

Drilling wells in deepwater can result in a three to fourfold increase in the viscosity of conventional invert-emulsion drilling fluids. An invert-emulsion drilling fluid is typically more viscous at the seabed and does not flow easily because the drilling fluid temperature is reduced by the deepwater environment. The increased resistance to flow can increase the fluid column hydraulic pressure when circulating the drilling fluid. Increases in column pressure can overcome the wellbore horizontal stress and exceed the fracture gradient, which can result in loss of drilling fluid (i.e., loss of circulation) to induced fractures in the formation. Another potential viscosity increase occurs when drilling operations and circulation of the drilling fluid are stopped, particularly if the mud system remains static over time. When static, the drilling fluid can develop a gel strength that may require high pumping pressure to reestablish circulation. Effects of increased viscosity include costly loss of drilling fluid, severe reservoir damage, and loss of wellbore integrity.

Flat rheology drilling fluids have been developed for deepwater wells in an effort to prevent loss of circulating drilling fluid to induced fractures. Flat rheology drilling fluids are designed to demonstrate a minimal variance in certain rheological properties across temperatures from 40° F. to 150° F. as measured at atmospheric pressure. Relevant rheological properties include plastic viscosity ("PV"), yield stress, yield point ("YP"), low shear yield point ("LSYP"), and gel strength.

Current methods for designing flat rheology drilling fluids define variations in rheological properties only under atmospheric pressure conditions, not downhole pressures. In fact, the rheological properties of the flat rheology drilling fluids have been shown to change under downhole versus ambient conditions, especially in deepwater environments.

DETAILED DESCRIPTION OF SELECTED EMBODIMENTS

Figure 1:
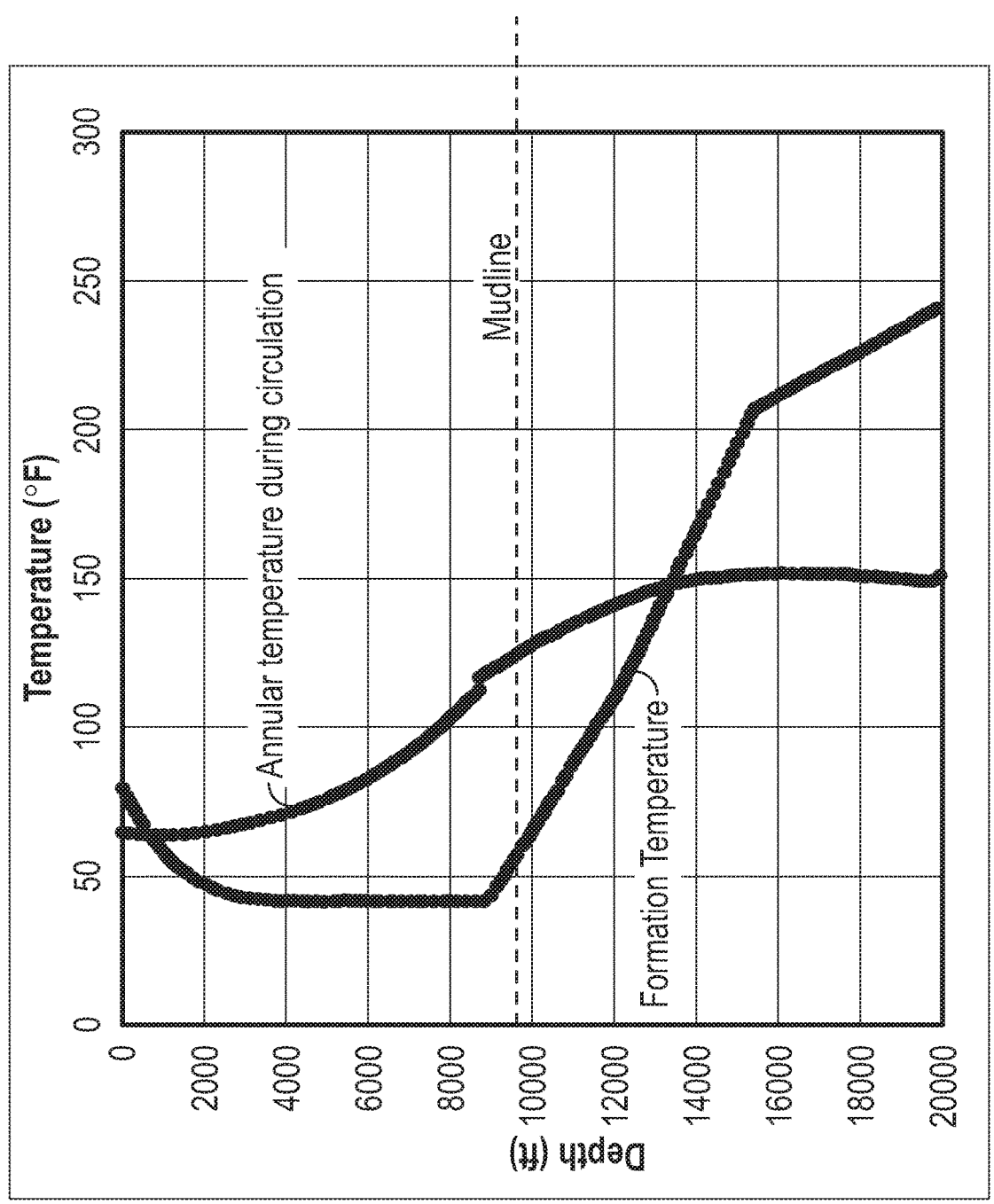
FIG. 1 is a graph illustrating the relationship between the formation temperature and the annular temperature (i.e., circulating temperature) at various depths in a representative well in the Gulf of Mexico.

As used herein, drilling fluids are also referred to as "drilling muds," synthetic-based muds ("SBM"), or simply "muds." The terms "invert emulsion," "oil mud," "oil-based mud," or "drilling fluid" are used interchangeably to include synthetic-based mud (SBM) or other synthetic fluids as well as natural or traditional oil-based mud systems. As used herein, "about" means a variance of ±5° F. for a temperature value, ±500 psi for a pressure value, and/or ±5% for any other number, such as an amount of a component in a chemical composition (e.g., a weight or volume), a property measurement or calculated value as applicable.

Improved rheology drilling fluids ("IR drilling fluids") and improved methods of drilling wellbores in deepwater formations are disclosed herein. The IR drilling fluids include synthetic-based muds, and more particularly, invert emulsion-based drilling muds. The IR drilling fluids are designed to provide consistent rheological properties across downhole temperatures and pressures that drilling fluids are typically subjected to during circulation and drilling operations. The IR drilling fluids are particularly useful for deepwater drilling below the mudline and exceeding depths of 20,000 feet below the mudline, at pressures between about atmospheric pressure and about 30,000 psi and a range of temperatures from about 40° F. to about 300° F. The IR drilling fluids may be referred to as drilling fluid systems. The IR drilling fluids may also be referred to as 3-D drilling fluids or 3-D drilling fluid systems because they are engineered for specific rheology performance in deepwater applications with respect to pressure, temperature, and formulation.

As explained in more detail below, the IR drilling fluids exhibit minimal variance in YP and/or minimal variance in LSYP measured across a range of temperatures and a range of pressures, including certain high-temperature, high-pressure (HTHP) conditions (e.g., measured using a FANN® iX77 HPHT Rheometer). Specifically, the YP variance and/or LSYP variance of the IR drilling fluids are below 60 percent when measured at each of the following temperature and pressure combinations to which a drilling fluid is subjected during circulation in a representative well: (1) about 65° F. and about 15 psi, (2) about 65° F. and about 1,800 psi, (3) about 100° F. and about 5,100 psi, (4) about 150° F. and about 9,000 psi, and (5) about 150° F. and about 12,700 psi. Alternatively, the IR drilling fluids may be designed to exhibit YP variance and/or LSYP variance of less than 60 percent when measured at temperature and pressure combinations to which the IR drilling fluid will be subjected when circulating in a target well in which the IR drilling fluid will be used. The IR drilling fluids include a viscosifier and a polymeric rheology modifier in a weight ratio of about 6 to about 14 (i.e., amount of viscosifier to amount of rheology modifier).

During drilling operations, the IR drilling fluids maintain consistently low values in the differences between the density of the fluid at the surface and the equivalent circulating density ("ECD") of the fluid at the bottom of the wellbore. When operations and circulation are stopped, the IR drilling fluids remain flowable with minimal gel strength developing. The IR drilling fluids are particularly useful in drilling operations involving minimal tolerances between pore pressure and fracture gradients. The pressure tolerance of a well depends on the formation properties. Typically, the density of the drilling fluid is adjusted on surface to account for downhole pressure tolerances based on hydraulic simulations and measured real time data from drilling equipment. When significantly different formation pressures exist in a single interval, the present IR drilling fluids minimize the risk of differential sticking due to high ECDs while density adjustments are made at the surface as indicated by wellbore conditions.

In certain embodiments, the IR drilling fluids are characterized by a balance between downhole rheological properties and sag values, which may be obtained using a viscometer sag shoe test (VSST).

The IR drilling fluids comprise (a) a continuous phase, (b) an internal phase, (c) an emulsifier, (d) a viscosifier, and (e) a polymeric rheology modifier. The weight ratio of viscosifier to polymeric rheology modifier in the IR drilling fluid is about 6 to about 14. Preferably, the weight ratio of viscosifier to polymeric rheology modifier in the IR drilling fluid is about 8 to about 12. In one embodiment, the weight ratio of viscosifier to polymeric rheology modifier in the IR drilling fluid is about 10. The IR drilling fluids may have an oil to water ratio ranging from 60:40 to 95:5.

The continuous phase of the IR drilling fluid may consist of a paraffin base fluid, an olefin base fluid, a mineral oil, an ester, or a mixture of any combination thereof. In one embodiment, the continuous phase may consist of an olefin or internal olefin with a carbon chain length between 15 and 18, or any subrange therein. For example, the continuous phase may comprise BIO-BASE® 100LF. Alternatively, the continuous phase consists of diesel, synthetic base oils, or any other base oils subject to applicable environmental regulations. The amount of the continuous phase in the IR drilling fluid is about 40 to about 95 volume percent or any subrange therein, preferably about 40 to about 90 volume percent or any subrange therein, and more preferably about 50 to about 80 volume percent or any subrange therein. For example, the amount of the continuous phase may be about 50 to about 60 volume percent, or any subrange therein.

The internal phase of the IR drilling fluid consists of an aqueous solution having one or more solutes. The concentration of the solutes in the aqueous solution may be about 10 to about 40 weight percent, or any subrange therein. Preferably, the concentration of the solutes in the aqueous solution may be about 20 to about 30 weight percent, or any subrange therein (e.g., about 25 weight percent). The one or more solutes may consist of any salt, such as calcium chloride, sodium chloride, calcium bromide, or a combination thereof. The salt may have a purity of 96% or greater. For example, the internal phase may consist of a 25% by weight calcium chloride brine solution. Alternatively, the one or more solutes may consist of a glycol or a polyglycerine. As used herein, "solution" includes homogenous and non-homogenous mixture. The amount of the internal phase in the IR drilling fluid is about 5 to about 40 weight percent, or any subrange therein. For example, the amount of the internal phase may be about 5 to about 25 weight percent, or any subrange therein.

The emulsifier of the IR drilling fluid comprises a surfactant. In one embodiment, the surfactant consists of a fatty acid, a tall oil, or a reaction product of diethylenetriamine, maleic anhydride, tetraethylenepentamine, and triethylenetriamine. For example, the emulsifier may be MAXMUL commercially available from QMax. The amount of the emulsifier in the IR drilling fluid is about 5 to about 20 pounds per barrel, or any subrange therein. Preferably, the amount of the emulsifier in the IR drilling fluid is about 10 to about 15 pounds per barrel, or any subrange therein.

The viscosifier of the IR drilling fluid comprises an organophilic clay. The organophilic clay may be formed of clay minerals whose surfaces have been coated with a chemical to make them oil-dispersible. Bentonite and hectorite (plate-like clays) and attapulgite and sepiolite (rod-shaped clays) are treated with oil-wetting agents during manufacturing and are used as oil-mud additives. For example, the viscosifier may be MAXVIS commercially available from QMax. The amount of the viscosifier in the IR drilling fluid is about 0.3 to about 20 pounds per barrel or any subrange therein, preferably about 0.5 to about 3 or any subrange therein, and more preferably about 1.5 to about 3 pounds per barrel or any subrange therein. In one example, the IR fluid contains about 1.75 to about 2.5 pounds per barrel of the viscosifier, or any subrange therein.

The polymeric rheology modifier of the IR drilling fluid comprises a reaction product of a fatty acid and a polyamine. For example, the polymeric rheology modifier may comprise a reaction product of a dimer fatty acid having at least two carboxylic moieties and a polyamine having an amine functionality of two or more. In another embodiment, the polymeric rheology modifier may comprise a polyamide having repeat units of a carboxylic unit having at least two carboxylic moieties and a polyamine unit having an amine functionality of two or more. In one embodiment, the rheology modifier may be MAXMOD commercially available from QMax. The amount of the polymeric rheology modifier in the IR drilling fluid is about 0.05 to about 2 pounds per barrel or any subrange therein, preferably about 0.1 to about 2 pounds per barrel or any subrange therein, and more preferably about 0.1 to about 0.5 pounds per barrel or any subrange therein. For example, the IR fluid may contain about 0.15 to about 0.45 pounds per barrel of the rheology modifier, or any subrange therein.

Optionally, the IR drilling fluids further comprise an alkalinity control (e.g., lime), a fluid loss control agent (e.g., HTHP filtrate reducer), a weighting agent (e.g., barite), and/or a secondary emulsifier. In one embodiment, the IR drilling fluid comprises up to 600 pounds per barrel of a weighting agent, such as barite. The barite may have a specific gravity between about 4.1 and about 4.2. In another embodiment, the IR drilling fluid comprises about 0.5 to about 2 pounds per barrel of a fluid loss control agent or any subrange therein (e.g., about 1 pound per barrel of a fluid loss control agent). The fluid loss control agent may consist of a polymeric fluid loss control additive or a styrene/acrylate copolymer. For example, the fluid loss control agent may be QMAXTROL commercially available from QMax. In another embodiment, the IR drilling fluid comprises about 1 to about 12 pounds per barrel of an alkalinity control agent consisting of lime. In yet another embodiment, the IR drilling fluid comprises a secondary emulsifier consisting of a wetting agent, which may be an oleic acid-based wetting agent.

Drilling fluids having varying densities are used in drilling operations. For example, the process of drilling a single wellbore may involve the use of a lower density drilling fluid earlier in the process and a higher density drilling fluid later in the process as the wellbore is drilled to a greater depth. The IR drilling fluids may have densities between 8 and 18 pounds per gallon, or any subrange therein. For example, the IR drilling fluids may have densities between 12 and 16 pounds per gallon. The density may be controlled by varying the composition of the fluid. For example, an amount of barite or another weighting agent may be adjusted to adjust the density of the IR drilling fluid. Tables 1-6 set forth the composition of selected embodiments of the IR drilling fluids having various densities. The IR drilling fluids are not limited to these selected embodiments. Many other embodiments may be formed within the description of the IR drilling fluids.

Table 1 below provides the composition of IR drilling fluid 10A, along with the ratio of viscosifier to rheology modifier in the composition. This IR drilling fluid has a density of 10 ppg. The component amounts listed in Table 1 form 1 barrel of the composition.

TABLE 1

|  | 10A |
| --- | --- |
| Continuous phase, Biobase ® 100LF | 0.5910 bbl |
| Internal Phase, 25% CaCl$_2$ Brine | 0.2889 bbl |
| Emulsifier, MAXMUL | 10 lb |
| Viscosifier, MAXVIS | 2.5 lb |
| Rheology Modifier, MAXMOD | 0.25 lb |
| Alkalinity Control, Lime | 3 lb |
| Fluid Loss Control, QMAXTROL | 1 lb |
| Weighting Agent, Barite | 114.97 lb |
| Viscosifier/Modifier Ratio | 10 |

Table 2 below provides the composition of IR drilling fluids 12A, 12B, and 12C, along with the ratio of viscosifier to rheology modifier in each composition. Each of these IR drilling fluids has a density of 12 ppg. The component amounts listed in Table 2 form 1 barrel of each composition.

TABLE 2

|  | 12A | 12B | 12C |
| --- | --- | --- | --- |
| Continuous phase, Biobase ® 100LF | 0.5645 bbl | 0.5642 bbl | 0.5639 bbl |
| Internal Phase, 25% CaCl$_2$ Brine | 0.2387 bbl | 0.2387 bbl | 0.2387 bbl |
| Emulsifier, MAXMUL | 10 lb | 10 lb | 10 lb |
| Viscosifier, MAXVIS | 2.5 lb | 2.5 lb | 2.5 lb |
| Rheology Modifier, MAXMOD | 0.25 lb | 0.35 lb | 0.45 lb |
| Alkalinity Control, Lime | 3 lb | 3 lb | 3 lb |
| Fluid Loss Control, QMAXTROL | 1 lb | 1 lb | 1 lb |
| Weighting Agent, Barite | 227.99 lb | 227.96 lb | 227.94 lb |
| Viscosifier/Modifier Ratio | 10 | 7.1 | 5.6 |

Table 3 below provides the composition for IR drilling fluids 14A, 14B, 14C, 14D, 14E, and 14F, along with the ratio of viscosifier to rheology modifier in each composition. Each of these IR drilling fluids has a density of 14 ppg. The component amounts listed in Table 3 form 1 barrel of each composition.

TABLE 3

|  | 14A | 14B | 14C | 14D | 14E | 14F |
| --- | --- | --- | --- | --- | --- | --- |
| Continuous phase, Biobase ® 100LF | 0.5266 bbl | 0.5208 bbl | 0.5271 bbl | 0.5274 bbl | 0.5125 bbl | 0.5272 bbl |
| Internal Phase, 25% CaCl$_2$ Brine | 0.2015 bbl | 0.2015 bbl | 0.2016 bbl | 0.2016 bbl | 0.2018 bbl | 0.2017 bbl |
| Emulsifier, MAXMUL | 10 lb | 12 lb | 10 lb | 10 lb | 15 lb | 10 lb |
| Viscosifier, MAXVIS | 2.5 lb | 2.5 lb | 2.0 lb | 2.0 lb | 2.0 lb | 1.75 lb |
| Rheology Modifier, MAXMOD | 0.25 lb | 0.25 lb | 0.25 lb | 0.15 lb | 0.20 lb | 0.30 lb |
| Alkalinity Control, Lime | 3 lb | 3 lb | 3 lb | 3 lb | 3 lb | 3 lb |
| Fluid Loss Control, QMAXTROL | 1 lb | 1 lb | 1 lb | 1 lb | 1 lb | 1 lb |
| Weighting Agent, Barite | 338.53 lb | 338.13 lb | 338.83 lb | 338.85 lb | 337.83 lb | 338.96 lb |
| Viscosifier/Modifier Ratio | 10 | 10 | 8 | 13.3 | 10 | 5.8 |

Table 4 below provides the composition for IR drilling fluid 16A, along with the ratio of viscosifier to rheology modifier in the composition. This IR drilling fluid has a density of 16 ppg. The component amounts listed in Table 4 form 1 barrel of the composition.

TABLE 4

|  | 16A |
| --- | --- |
| Continuous phase, Biobase ® 100LF | 0.5053 bbl |
| Internal Phase, 25% CaCl$_2$ Brine | 0.1453 bbl |
| Emulsifier, MAXMUL | 10 lb |
| Viscosifier, MAXVIS | 2.5 lb |
| Rheology Modifier, MAXMOD | 0.25 lb |
| Alkalinity Control, Lime | 3 lb |
| Fluid Loss Control, QMAXTROL | 1 lb |
| Weighting Agent, Barite | 452.67 lb |
| Viscosifier/Modifier Ratio | 10 |

Table 5 below provides the composition for IR drilling fluid 17A, along with the ratio of viscosifier to rheology modifier in the composition. This IR drilling fluid has a density of 17 ppg. The component amounts listed in Table 5 form 1 barrel of the composition.

TABLE 5

|  | 17A |
| --- | --- |
| Continuous phase, Biobase ® 100LF | 0.5070 bbl |
| Internal Phase, 25% CaCl$_2$ Brine | 0.1029 bbl |
| Emulsifier, MAXMUL | 10 lb |
| Viscosifier, MAXVIS | 2.5 lb |
| Rheology Modifier, MAXMOD | 0.25 lb |
| Alkalinity Control, Lime | 3 lb |
| Fluid Loss Control, QMAXTROL | 1 lb |
| Weighting Agent, Barite | 512.47 lb |
| Viscosifier/Modifier Ratio | 10 |

Table 6 below provides the composition for IR drilling fluid 18A, along with the ratio of viscosifier to rheology modifier in the composition. This IR drilling fluid has a density of 18 ppg. The component amounts listed in Table 6 form 1 barrel of the composition.

TABLE 6

|  | 18A |
| --- | --- |
| Continuous phase, Biobase ® 100LF | 0.5053 bbl |
| Internal Phase, 25% CaCl$_2$ Brine | 0.0646 bbl |
| Emulsifier, MAXMUL | 10 lb |
| Viscosifier, MAXVIS | 2.5 lb |
| Rheology Modifier, MAXMOD | 0.25 lb |
| Alkalinity Control, Lime | 3 lb |
| Fluid Loss Control, QMAXTROL | 1 lb |
| Weighting Agent, Barite | 571.48 lb |
| Viscosifier/Modifier Ratio | 10 |

The rheological properties of a drilling fluid may be evaluated with laboratory tests for shear stress versus shear rate. Shear stress tests may be conducted using a concentric-cylinder viscometer (direct-indicating viscometer) as specified by API 13 B2 Recommended Practice for Field Testing Oil-Based Drilling Fluids. Examples of direct-indicating viscometers for measurements at atmospheric pressure include Fann® 35 and Ofite® 800 and 900.

For example, shear stress tests may use a direct-indicating viscometer, powered by an electric motor or a hand crank. The drilling fluid is placed in the annular space between two concentric cylinders. The outer cylinder or rotor sleeve is driven at a constant rotational velocity. The rotation of the rotor sleeve in the fluid produces a torque on the inner cylinder or bob. A torsion spring restrains the movement of the bob, and a dial attached to the bob indicates displacement of the bob ("dial reading" or "dial deflection"). The shear stress is determined by multiplying the dial reading by 1.066. As used herein, "dial reading" means the shear stress-type measurement taken at a specified rotational rate using a direct-indicating viscometer at atmospheric pressure or under high-temperature, high-pressure conditions, as specified. Instrument constants should be adjusted so that plastic viscosity and yield point are obtained by using readings from rotor sleeve speeds of 300 r/min and 600 r/min. The rotor sleeve should have an inside diameter of 36.83 mm (1.450 in), a total length of 87.0 mm (3.425 in), and a scribed line 58.4 mm (2.30 in) above the bottom of sleeve. The rotor sleeve should have two rows of 3.18 mm (0.125 in) holes spaced 120 degrees (2.09 rad) apart around the rotor sleeve just below the scribed line. The rotor sleeve surface should have a surface roughness average of 16 to 32 cross-hatch honed. The rotor sleeve speeds should include a high speed of 600 r/min and a low speed of 300 r/min. The bob should be closed with a flat base and a tapered top. The bob should have a diameter of 34.49 mm (1.358 in), a cylinder length of 38.0 mm (1.496 in), and a rotor surface with a surface roughness average of 16 to 32 cross-hatch honed. The torsion spring should have a torsional stiffness of 10.54 N-m/rad (386 dyne-cm/degree deflection), a shear stress constant of 29.3 pascals per radian deflection (0.511 pascals per degree of deflection) (1,065 lb/100 ft$^2$ and degree of deflection). Examples of direct-indicating viscometers for measurements at atmospheric pressure include Fann® 35 and Ofite® 800 and 900.

The rheological properties of the IR drilling fluids in Tables 1-6 were evaluated with laboratory testing. A Fann® 35 rheometer was used to measure the dial readings at various combinations of shear rates (600, 300, 200, 100, 6, and 3 rpm) at ambient pressure and temperatures (40° F., 100° F., 120° F., and 150° F.). The gel strength at each temperature was also measured for each composition. From these measurements, the PV, YP, and LSYP were calculated. PV is calculated by subtracting the dial reading at 300 rpm from the dial reading at 600 rpm for a particular temperature. YP is calculated by subtracting PV from the dial reading at 300 rpm for a particular temperature. LSYP is calculated by subtracting the dial reading at 6 rpm from twice the dial reading at 3 rpm for a particular temperature. From the YP values for each fluid across the temperatures, YP variance was calculated for each fluid as follows:

$$YP\ variance = \frac{(YP_{Max} - YP_{Min})}{YP_{Min}} * 100\%$$

Where $YP_{Min}$ is the lowest YP value for the fluid across the temperatures and $YP_{Max}$ is the greatest YP value for the fluid across the temperatures. From the LSYP values for each fluid across the temperatures, LSYP variance was calculated for each fluid as follows:

$$LSYP\ variance = \frac{(LSYP_{Max} - LSYP_{Min})}{LSYP_{Min}} * 100\%$$

Where $LSYP_{Min}$ is the lowest LSYP value for the fluid across the temperatures and $LSYP_{Max}$ is the greatest LSYP value for the fluid across the temperatures.

The same laboratory tests and calculations were conducted on conventional flat rheology drilling fluids. Table 7 below provides a comparison of IR drilling fluid 14A and a representative conventional flat rheology drilling fluid (FR-14). Both fluids have a density of 14 ppg. The composition of the two fluids is provided. As shown, the ratio of viscosifier to rheology modifier in fluid 14A is 10, while the ratio of viscosifier to rheology modifier in fluid FR-14 is 1.5. The dial readings of each fluid are shown, along with the calculated YP and LSYP values for each temperature.

TABLE 7

|  | IR Fluid 14A (14 ppg) | | | | FR-14 (14 ppg) | | | |
| --- | --- | --- | --- | --- | --- | --- | --- | --- |
| Continuous Phase, Bio-base ® 100 LF | 0.5266 bbl | | | | 0.5254 bbl | | | |
| Internal Phase, 25% CaCl2 Brine | 0.2015 bbl | | | | 0.2018 bbl | | | |
| Emulsifier, MAXMUL | 10.00 lb | | | | 10.00 lb | | | |
| Viscosifier, MAXVIS | 2.50 lb | | | | 1.50 lb | | | |
| Rheology Modifier, MAXMOD | 0.25 lb | | | | 1.00 lb | | | |
| Alkalinity Control, Lime | 3.00 lb | | | | 3.00 lb | | | |
| Fluid Loss Control, QMAXTROL | 1.00 lb | | | | 1.00 lb | | | |
| Weighting Agent, Barite 4.2 | 338.53 lb | | | | 338.96 | | | |
| Ratio of Viscosifier:Modifier | 10 | | | | 1.5 | | | |
| Rheological Property Measurements (Atmospheric Pressure) | | | | | | | | |
| Temperature, ° F. | 40 | 100 | 120 | 150 | 40 | 100 | 120 | 150 |
| 600 rpm | 174 | 74 | 68 | 58 | 187 | 104 | 91 | 76 |
| 300 rpm | 103 | 46 | 43 | 37 | 109 | 67 | 59 | 49 |
| 200 rpm | 78 | 36 | 34 | 30 | 81 | 53 | 47 | 40 |
| 100 rpm | 51 | 25 | 24 | 21 | 51 | 38 | 34 | 30 |
| 6 rpm | 18 | 10 | 10 | 9 | 23 | 21 | 18 | 16 |
| 3 rpm | 17 | 9 | 9 | 8 | 22 | 20 | 17 | 16 |
| Plastic viscosity, cP | 71 | 28 | 25 | 21 | 78 | 37 | 32 | 27 |
| YP, lb/100 ft$^2$ | 32 | 18 | 18 | 16 | 31 | 30 | 27 | 22 |
| YP Variance | | 100% | | | | 41% | | |
| LSYP, lb/100 ft$^2$ | 16 | 8 | 8 | 7 | 21 | 19 | 16 | 16 |
| LSYP Variance | | 129% | | | | 31% | | |
| 10-sec Gel, lb/100 ft$^2$ | 18 | 11 | 11 | 11 | 30 | 24 | 22 | 21 |
| 10-min Gel, lb/100 ft$^2$ | 25 | 18 | 19 | 19 | 41 | 38 | 32 | 25 |

At atmospheric pressure, IR drilling fluid 14A had a YP variance of 100%, while fluid FR-14 had a YP variance of 41% between 40° F. and 150° F. Similarly, IR drilling fluid 14A had an LSYP variance of 129%, while fluid FR-14 had an LSYP variance of 31% under these temperature and pressure conditions.

Conventional flat rheology fluids, however, have been found to have greater variance in rheological properties at downhole conditions, which includes higher pressures than atmospheric pressure at which all measurements in Table 7 were performed. The IR drilling fluids have lower YP variance and LSYP variance values than the conventional flat rheology fluids as designed when the rheological properties are measured at temperature and pressure values matching actual circulating values for drilling fluids in a wellbore (i.e., HTHP conditions).

Pressure and temperature data was obtained for circulating conditions in a representative deepwater well in the Gulf of Mexico. Circulating conditions means the annular temperature and pressure at a particular depth (i.e., the temperature and pressure combinations to which the drilling mud is subjected during drilling operations). FIG. 1 graphically illustrates the relationship between the formation temperature and the annular temperature (i.e., circulating temperature) of the representative well at various depths. For example, the drilling fluid does not reach the seabed/formation temperature at the mudline during circulation.

Figure 2:
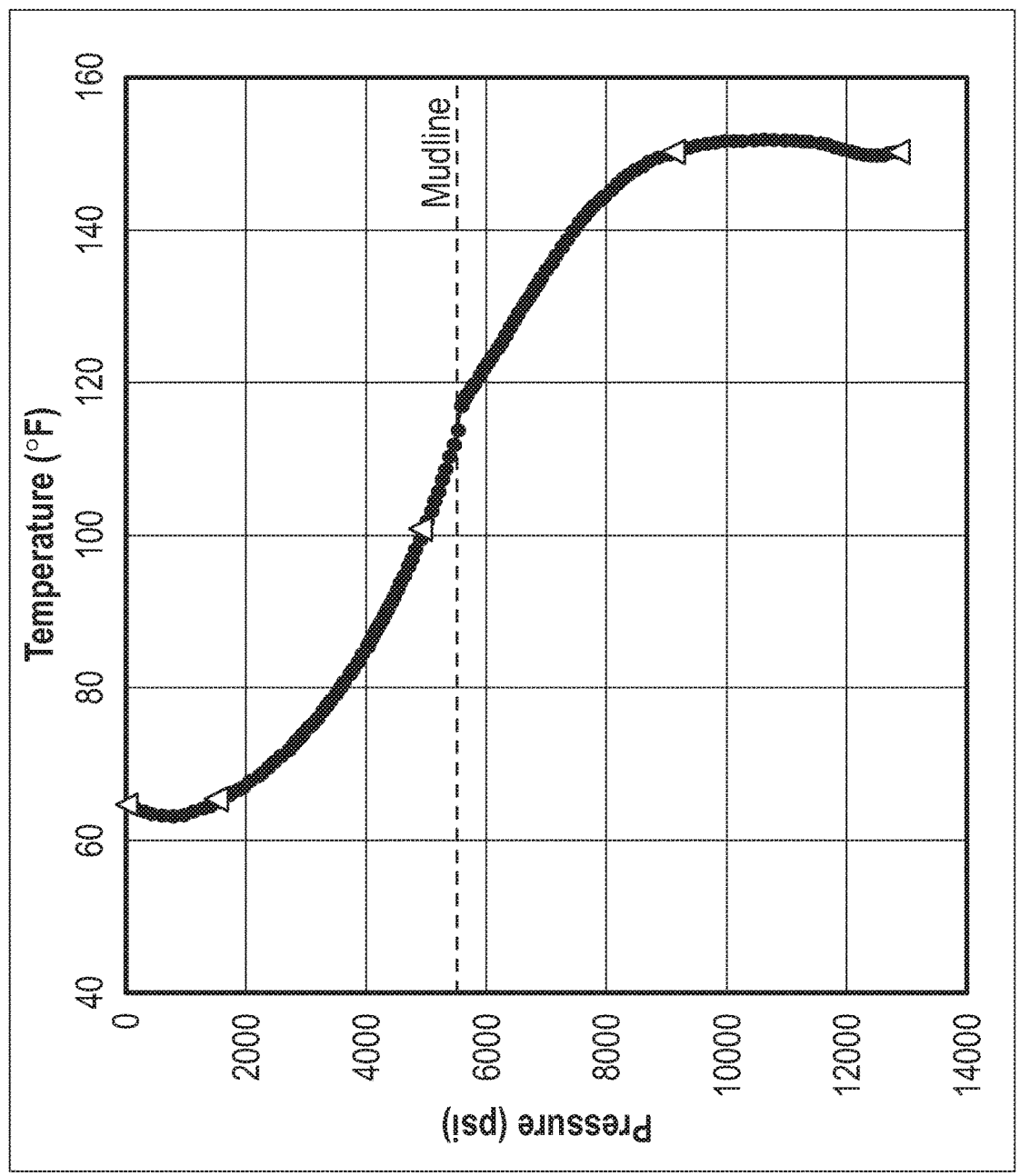
FIG. 2 is a graph illustrating the circulating temperature (T) and pressure (P) combinations in the representative well assuming a fluid density of 12 ppg.

FIG. 2 graphically illustrates the circulating temperature and pressure combinations of a drilling fluid in the representative well. A TP combination set is defined by the five data points marked by triangular shapes on the curve shown in FIG. 2. Table 8 below lists the temperature and pressure combinations in the TP combination set for the representative well.

TABLE 8

| Temperature (° F.) | Pressure (psi) |
| --- | --- |
| About 65 | About 15 |
| About 65 | About 1800 |
| About 100 | About 5100 |
| About 150 | About 9000 |
| About 150 | About 12700 |

Laboratory tests were conducted on each of the IR drilling fluids in Tables 1-6 using an HTHP viscometer (namely, a Fann® iX77 HPHT Rheometer) to simulate the fluid's rheological properties downhole. For each IR drilling fluid tested, the dial reading was measured at various shear rates (600, 300, 200, 100, 6, 3) at each temperature and pressure combination in the TP combination set for the representative well. The PV, YP, and LSYP were calculated for each fluid at each temperature and pressure combination. The gel strength at each temperature and pressure combination was also measured for each fluid.

TABLE 9

| | T, °F. | P, psi | 600 rpm | 300 rpm | 200 rpm | 100 rpm | 6 rpm | 3 rpm | PV, cP | YP | YP Variance | LSYP | LSYP Variance |
|---|---|---|---|---|---|---|---|---|---|---|---|---|---|
| IR Fluid 10A | 66 | 0 | 72 | 45 | 36 | 26 | 13 | 12 | 27 | 18 | 50% | 12 | 21% |
| | 66 | 2254 | 84 | 53 | 42 | 30 | 15 | 14 | 31 | 22 | | 13 | |
| | 100 | 5163 | 69 | 44 | 35 | 25 | 13 | 12 | 25 | 19 | | 11 | |
| | 151 | 9345 | 62 | 39 | 31 | 22 | 12 | 12 | 24 | 15 | | 11 | |
| | 151 | 12983 | 75 | 46 | 36 | 25 | 14 | 14 | 29 | 17 | | 13 | |
| IR Fluid 12A | 65 | 0 | 71 | 48 | 39 | 28 | 15 | 15 | 23 | 25 | 31% | 15 | 39% |
| | 67 | 2114 | 91 | 59 | 48 | 34 | 18 | 17 | 32 | 26 | | 17 | |
| | 99 | 5267 | 78 | 52 | 41 | 29 | 14 | 14 | 26 | 26 | | 13 | |
| | 153 | 9236 | 68 | 46 | 37 | 26 | 13 | 13 | 21 | 25 | | 12 | |
| | 154 | 13022 | 78 | 55 | 44 | 31 | 15 | 14 | 23 | 32 | | 13 | |
| IR Fluid 14A | 65 | 0 | 95 | 58 | 46 | 33 | 16 | 16 | 37 | 21 | 50% | 15 | 31% |
| | 65 | 2258 | 122 | 74 | 58 | 40 | 19 | 18 | 48 | 25 | | 17 | |
| | 100 | 5218 | 84 | 57 | 45 | 31 | 15 | 14 | 27 | 30 | | 13 | |
| | 151 | 9321 | 76 | 51 | 42 | 29 | 15 | 14 | 24 | 27 | | 14 | |
| | 151 | 13011 | 88 | 60 | 48 | 33 | 17 | 16 | 28 | 32 | | 15 | |
| IR Fluid 16A | 67 | 0 | 140 | 84 | 65 | 45 | 19 | 17 | 56 | 28 | 50% | 16 | 41% |
| | 67 | 2198 | 156 | 93 | 71 | 48 | 20 | 18 | 62 | 31 | | 17 | |
| | 100 | 5205 | 121 | 71 | 55 | 38 | 15 | 14 | 50 | 21 | | 13 | |
| | 153 | 9288 | 97 | 64 | 50 | 35 | 15 | 13 | 33 | 31 | | 12 | |
| | 153 | 12896 | 119 | 75 | 58 | 40 | 16 | 14 | 44 | 31 | | 12 | |
| IR Fluid 17A | 65 | 0 | 141 | 83 | 64 | 43 | 19 | 17 | 58 | 25 | 55% | 16 | 53% |
| | 65 | 2195 | 172 | 100 | 76 | 51 | 20 | 18 | 72 | 28 | | 17 | |
| | 99 | 5258 | 126 | 72 | 54 | 35 | 13 | 12 | 54 | 18 | | 11 | |
| | 151 | 9321 | 100 | 60 | 48 | 33 | 15 | 13 | 39 | 21 | | 11 | |
| | 151 | 13021 | 122 | 73 | 56 | 36 | 16 | 15 | 49 | 24 | | 14 | |
| IR Fluid 18A | 66 | 0 | 145 | 87 | 64 | 40 | 13 | 11 | 58 | 28 | 49% | 10 | 56% |
| | 66 | 2211 | 179 | 104 | 75 | 47 | 15 | 14 | 75 | 29 | | 13 | |
| | 100 | 5196 | 134 | 76 | 57 | 35 | 11 | 10 | 57 | 19 | | 9 | |
| | 152 | 9342 | 109 | 65 | 48 | 30 | 10 | 9 | 44 | 21 | | 8 | |
| | 152 | 13010 | 137 | 78 | 57 | 35 | 11 | 10 | 58 | 20 | | 8 | |

The HTHP viscometer measurements for IR drilling fluid 10A, 12A, 14A, 16A, 17A, and 18A are shown in Table 9 above. Across the TP combination set for the representative well, the YP variance for the IR drilling fluids were below 60%, namely, between 31% and 55%, and the LSYP variance for the IR drilling fluids were below 60%, namely, between 31% and 56%.

Figure 3:
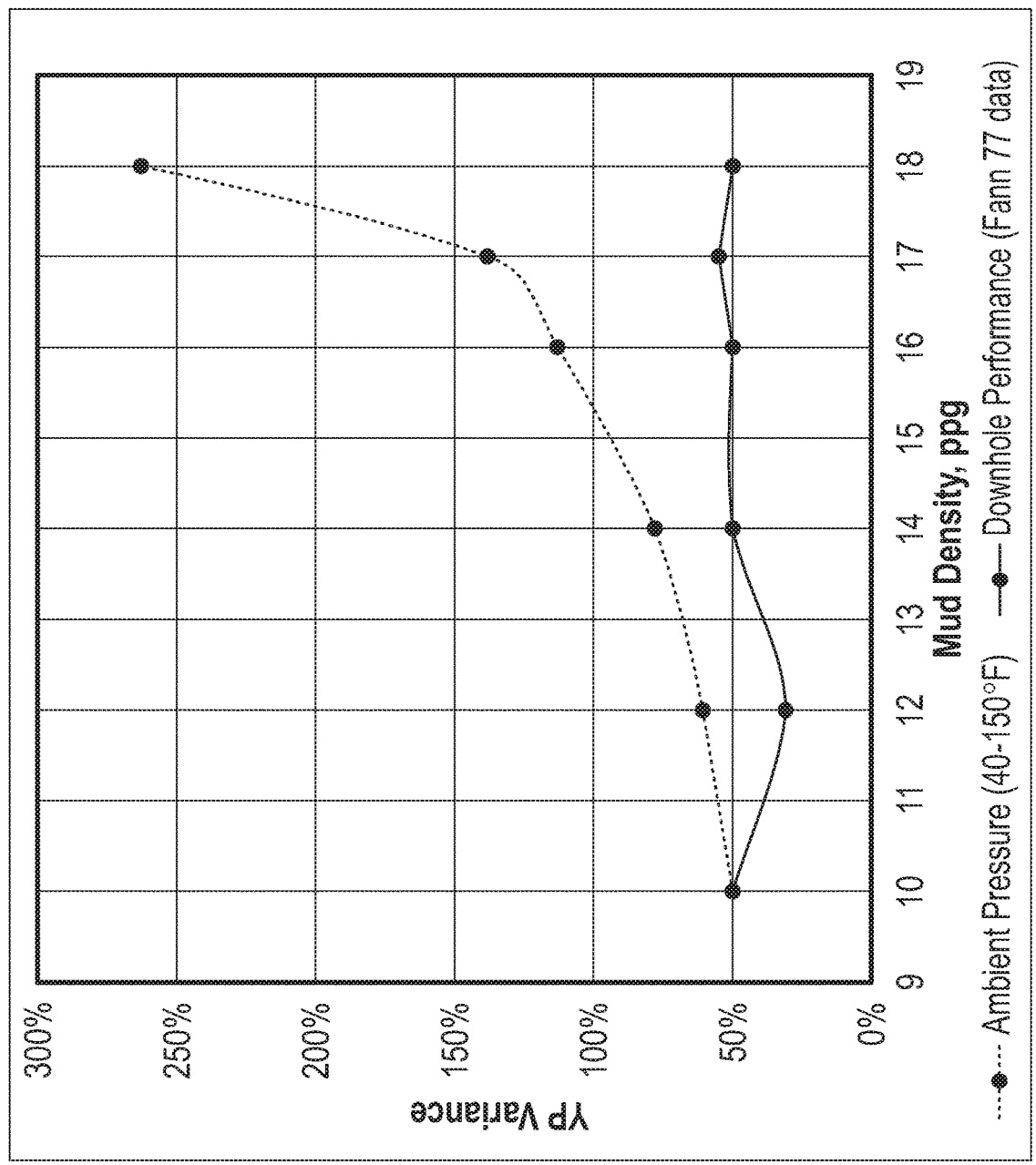
FIG. 3 is a graph illustrating the YP variance of improved rheology (IR) drilling fluids having varying densities as measured at atmospheric pressure and at simulated downhole pressures.
Figure 4:
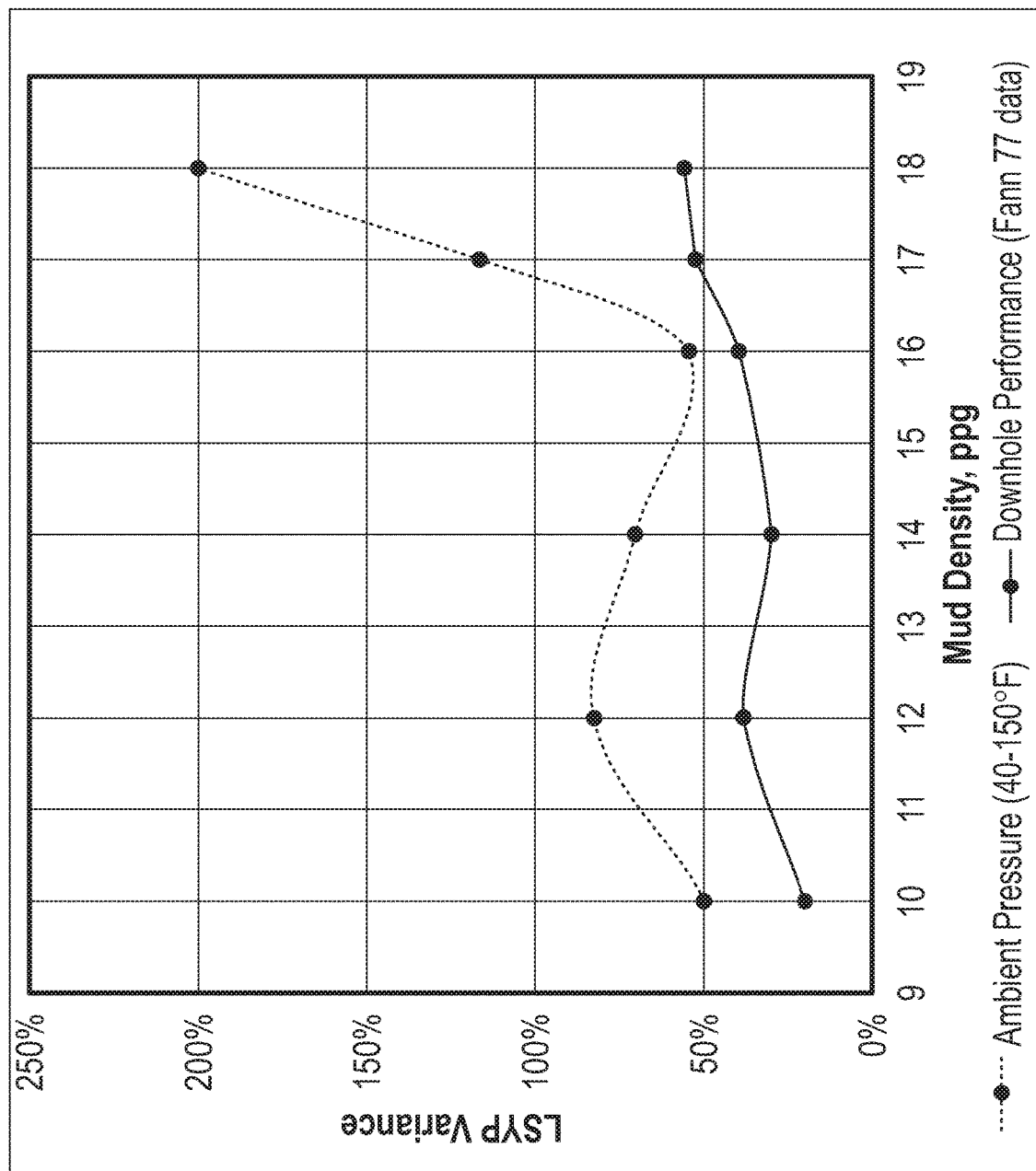
FIG. 4 is a graph illustrating the LSYP variance of IR drilling fluids having varying densities as measured at atmospheric pressure and at simulated downhole pressures.

FIGS. 3 and 4 illustrate the YP variance and the LSYP variance, respectively, of the various IR Fluids in Table 9 when measured at atmospheric pressure between 40° F. and 150° F. and when measured under the HTHP conditions shown in Table 9. The YP and LSYP variances are lower under downhole conditions than at atmospheric pressure.

The same HTHP laboratory testing was conducted on conventional flat rheology drilling fluids for comparison. Under these downhole conditions, the IR drilling fluids exhibited less variance in rheological properties than the conventional flat rheology drilling fluids.

ECD is the effective density exerted by a circulating fluid against the formation that takes into account the pressure drop in the annulus above the point being considered. One objective for drilling fluids is to minimize ECD, especially for drilling wells with narrow windows between fracture gradient and pore pressure. The ECD generated is the difference between the density of the drilling fluid at the surface and the density of the drilling fluid at the bottom of the wellbore. For example, if the surface density is 12.0 ppg and the ECD increases to 12.46 in the wellbore, the generated ECD value is 0.46.

The ECD value depends on the presence of drill cuttings in the drilling fluid. Without cuttings, ECD is calculated using the following formula:

$$ECD = ESD_a + \frac{(P_a + P_{cl} + P_c)}{0.052D_{tvd}}$$

Where ESDa is equivalent static density at the depth of interest, Pa is annular pressure loss, Pcl is choke line pressure loss, and Pc is casing pressure (back pressure on annulus). With cuttings, ECD is calculated using the following formula:

$$ECD = (1 - c_a)ESD_a + 8.345c_a\rho_c + \frac{(P_a + P_{cl} + P_c)}{0.052D_{tvd}}$$

The HTHP viscometer data for the drilling fluids were used to develop a rheology-pressure-temperature matrix, and then to develop hydraulic modeling software for determining equivalent circulating density (ECD) and equivalent static density (ESD). The IR drilling fluid systems can be used in combination with the hydraulic modeling software. Essentially, the IR drilling fluids can be engineered to ensure downhole control of the ECD and ESD, thereby enhancing wellbore stability and reducing the possibility of inducing fluid losses to the formation. Controlling downhole fluid rheology allows for improved tripping speeds, lower overall fluid gel strengths, and reducing pressure spikes.

Greater variance of rheological properties under circulating conditions downhole (as illustrated by HTHP viscometer data across the TP combination set) indicates a greater variance in ECD. The HTHP viscometer data measured at the TP combination set for the representative well provide a better indication of ECD stability of a particular drilling fluid formulation than viscometer data measured at atmospheric pressure. In other words, measuring rheological properties of a drilling mud at the temperature and pressure combinations experienced by the drilling mud in circulation during drilling operations is a better direct indication of ECD stability of the particular drilling mud formulation.

The generated ECD was calculated for each IR drilling fluid using hydraulic simulations, specifically, MAXSITE Hydraulics owned by QMax. The ECD calculation used the following parameters, which may be considered typical of a Gulf of Mexico wellbore: ambient temperature of about 80° F., a suction temperature of about 60° F., a flowline temperature of about 65° F., a bottomhole circulating temperature of about 150° F., a mudline temperature of about 41° F., and formation temperatures of about 41° F. at about 9,000 feet, 109° F. at about 12,000 feet, 207° F. at about 15,000 feet, 241° F. at about 20,000 feet, and 302° F. at about 22,000 feet; a total depth of about 20,000 feet, a water depth of about 9,000 feet, and an air gap of about 80 feet; using a riser with an inner diameter of about 19.5 inches over the air gap and water depth, a cemented casing with an inner diameter of about 12.4 inches from the mudline to a depth of about 15,300 feet, an openhole with a diameter of about 12.25 inches from depths of about 15,300 feet to about 20,000 feet; a drill bit size of 12.25 inches; a flow rate of about 900 gallons per minute, a boost flow rate of about 300 gallons per minute, a rotary speed of about 130 rpm, and a rotating ROP of about 45 feet per hour; representative cuttings being small sandstone with diameter of about 0.05 inches, thickness of about 0.05 inches, and density of 2.2 sg. The generated ECD value for each IR drilling fluid included in Tables 1-6 was 0.30 or below. Table 10 below provides the generated ECD value calculated for certain IR drilling fluids and for conventional flat rheology drilling fluid FR-14 for comparison.

TABLE 10

| | Viscosifier/ Modifier Ratio | Generated ECD |
|---|---|---|
| Fluid 12A | 10 | 0.20 |
| Fluid 12B | 7.1 | 0.21 |
| Fluid 12C | 5.6 | 0.24 |
| Fluid 14A | 10 | 0.30 |
| Fluid 14B | 10 | 0.28 |
| Fluid 14C | 8 | 0.26 |
| Fluid 14D | 13.3 | 0.23 |
| Fluid 14E | 10 | 0.21 |
| Fluid 14F | 5.8 | 0.27 |
| Fluid FR-14 (for comparison) | 1.5 | 0.52 |

Figure 5:
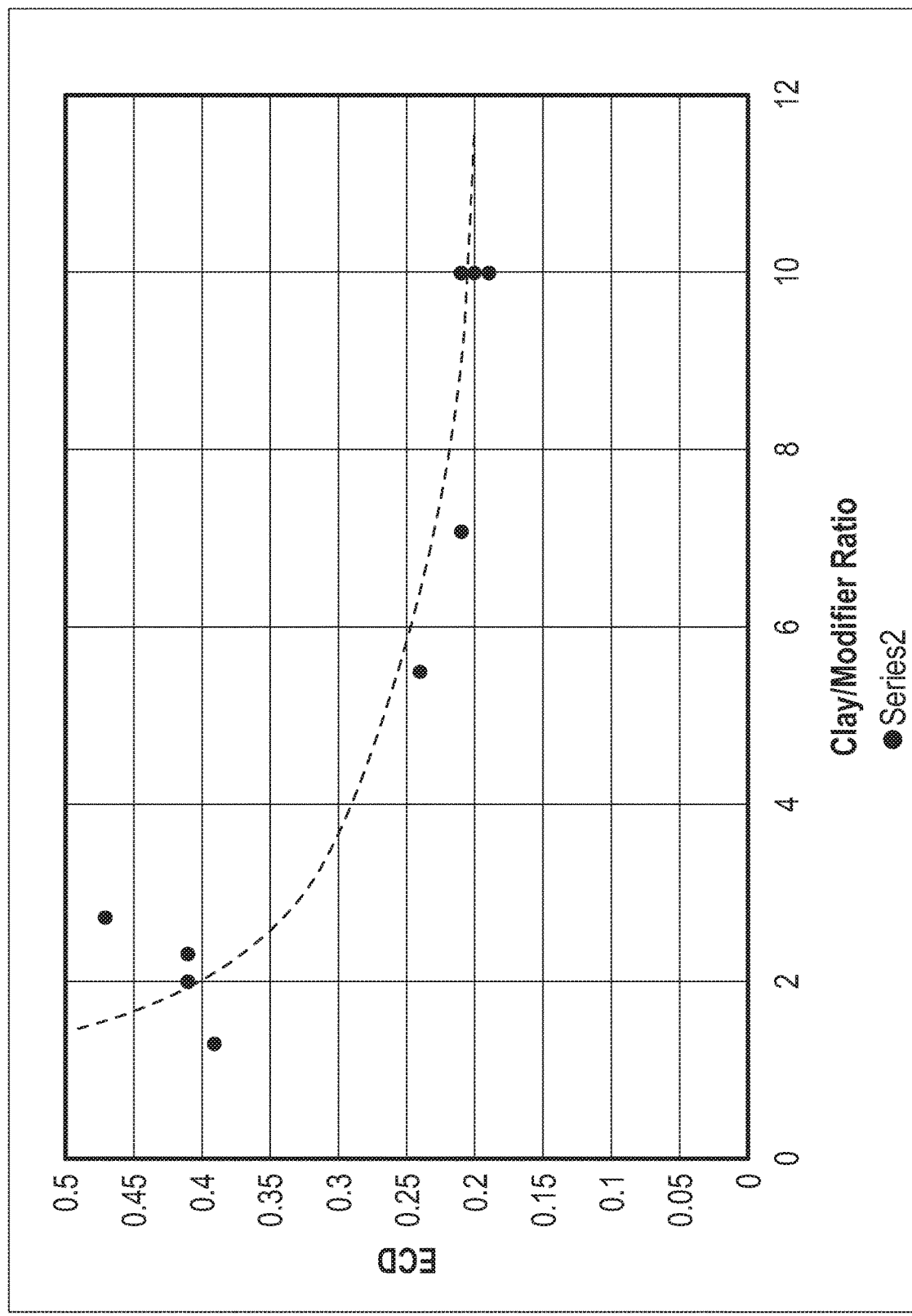
FIG. 5 is a graph illustrating generated ECD values of drilling fluids having varying clay to modifier weight ratios with densities of 12 ppg.
Figure 6:
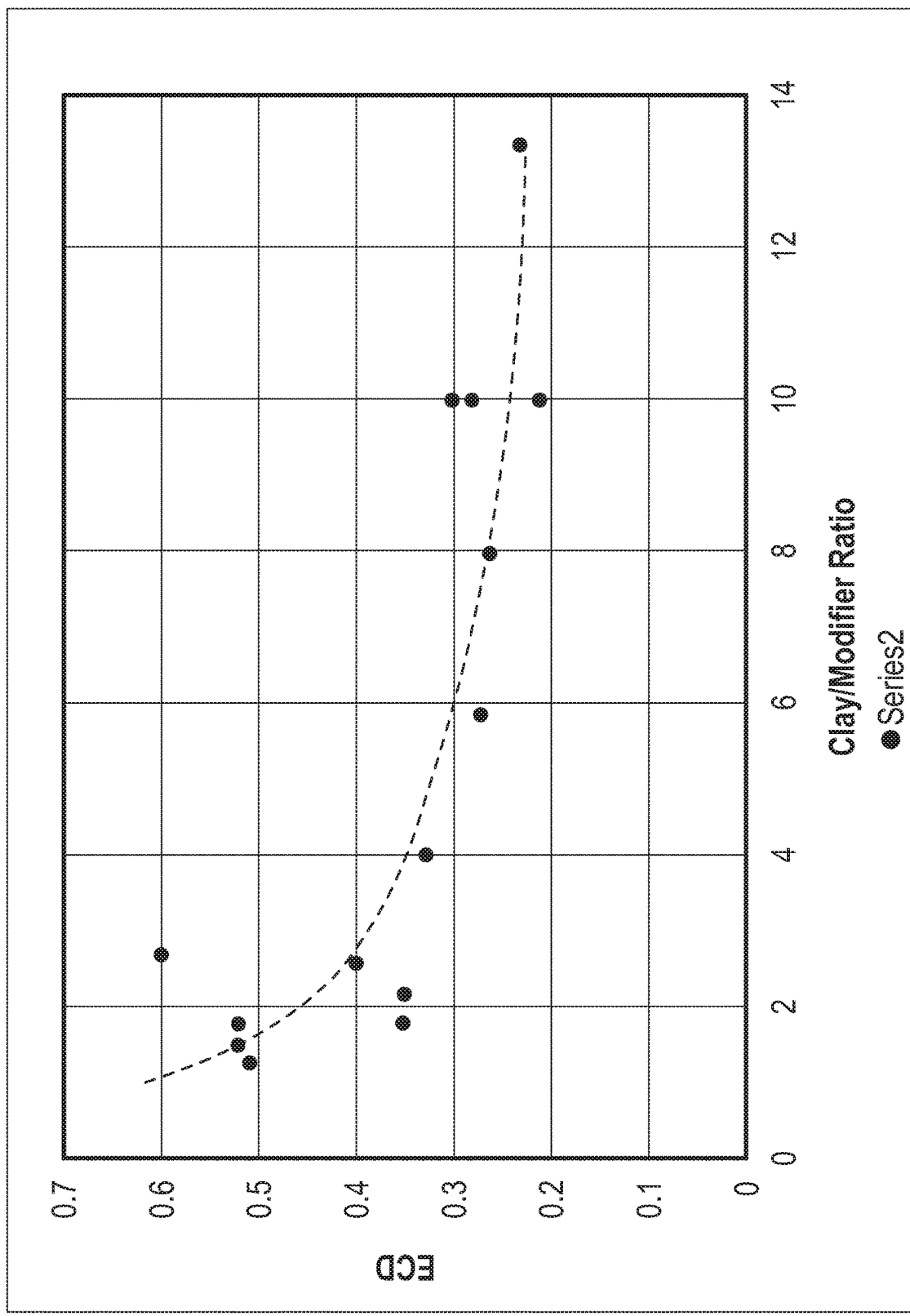
FIG. 6 is a graph illustrating generated ECD values of drilling fluids having varying clay to modifier weight ratios with densities of 14 ppg.

FIG. 5 illustrates the generated ECD values for drilling fluids having varying clay to rheology modifier ratios with densities of 12 ppg. FIG. 6 illustrates the corresponding data for drilling fluids with densities of 14 ppg. The present IR drilling fluids include a viscosifier and a rheology modifier in a particular ratio that was found to minimize the generated ECD in wellbores. Specifically, the present IR drilling fluids include viscosifier and rheology modifier in a weight ratio between about 6 and about 14, and more preferably, between about 8 and about 12. The higher viscosifier to rheology modifier weight ratio in the IR drilling fluid is contrary to conventional methodologies for reducing ECD generated in a wellbore. Conventional flat rheology fluids include very small amounts of viscosifier (e.g., clay) and larger amounts of rheology modifier in an attempt to lower generated ECD in a wellbore. In other words, conventional flat rheology fluids include lower viscosifier to rheology modifier weight ratios, such as about 2 or below. This conventional methodology is based on the belief that removing viscosifier will reduce generated ECD.

The IR drilling fluid systems can be optimized for deepwater and ultra-deepwater applications. Consistent downhole rheology can be provided through use of (simulation of) downhole temperatures and downhole pressures. Through 3-D control, the IR drilling fluid system provides effective wellbore cleaning and increased rates of penetration while minimizing ECD by reducing the progression of LSYP of the drilling fluid under downhole conditions.

Some drilling fluids with decreased ECD generation may experience issues with sag in the wellbore. Sag is a significant variation in drilling fluid density (>0.5 to 1 ppg) along the mud column, which is the result of settling of the weighting agent or other solids in the drilling fluid. This effect is driven by gravity and impeded by fluid rheology, particularly non-Newtonian and time dependent rheology. Suspensions of solids in non-vertical columns are known to settle faster than suspensions in vertical ones, due to the "Boycott effect" demonstrated as sag. Sag can result in formation of a bed of the weighting agent on the low side of the wellbore and stuck pipe. Sag is problematic to the drilling operation and in extreme cases may cause hole abandonment.

The IR drilling fluids have a balance between decreased ECD generation and acceptable sag values. The sag values of the IR drilling fluids in Table 3 (density of 14 ppg) and flat rheology fluid FR-14 (included in Table 7 above) were tested using a viscometer sag shoe test (VSST). Table 11 below provides the VSST values measured, along with the generated ECD values. As shown, the IR drilling fluids yielded lower generated ECD values and higher VSST values than the conventional flat rheology fluid FR-14.

TABLE 11

| | Viscosifier/ Modifier Ratio | Generated ECD | VSST (lb/gal) |
|---|---|---|---|
| Fluid 14A | 10 | 0.30 | 2.12 |
| Fluid 14B | 10 | 0.28 | 2.15 |
| Fluid 14C | 8 | 0.26 | 2.33 |
| Fluid 14D | 13.3 | 0.23 | 2.66 |
| Fluid 14E | 10 | 0.21 | 2.93 |
| Fluid 14F | 5.8 | 0.27 | 2.45 |
| FR-14 (for comparison) | 1.5 | 0.52 | 0.54 |

Figure 7:
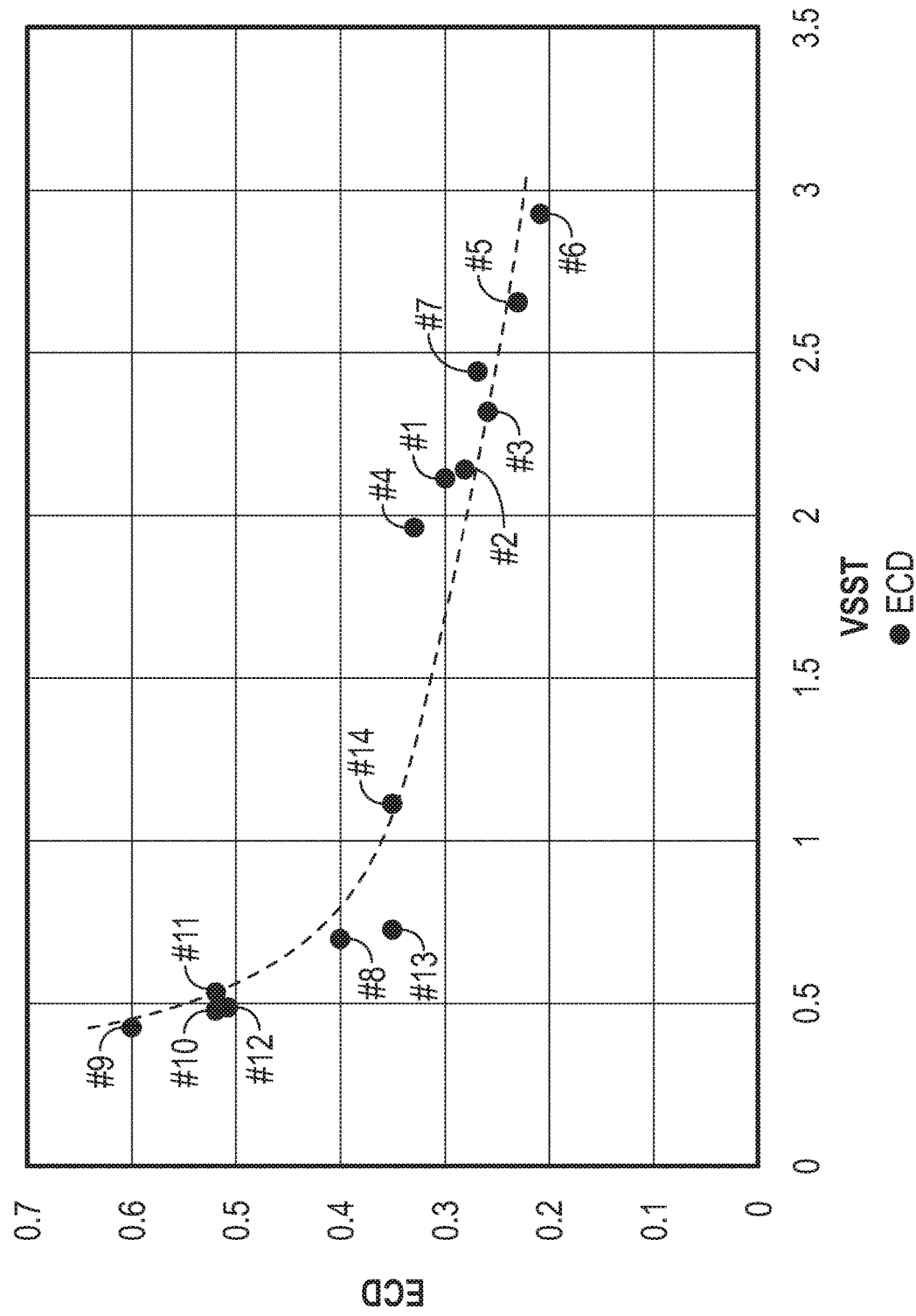
FIG. 7 is a graph illustrating the relationship between generated ECD values and VSST values for various drilling fluids.

FIG. 7 illustrates the relationship between generated ECD and VSST measurements for several drilling fluids all having densities of 14 ppg. The IR drilling fluids yielded ECD values of 0.30 and below with VSST values between 2 and 3 lb/gal. More specifically, the data points for the IR drilling fluids are labeled #1-3 and #5-7 in FIG. 7. The IR drilling fluids may be optimized for certain wellbores based on sag tolerances. In other words, the operator or vendor may select a particular IR drilling fluid formulation to provide the lowest possible generated ECD value with a VSST value below a threshold maximum for a particular wellbore.

Downhole stability is measured under simulated conditions (high temperature and high pressure) in laboratories. In general, additives in a drilling fluid degrade under temperature and pressure, which leads to changes in rheological properties. Tables 12, 13, and 14 below show the rheological properties and electrical stability of an exemplary IR drilling fluid system at 12.0 ppg after static aging at 250° F. Samples were prepared and hot rolled at 150° F. for 16 hours before static aging at 250° F. for allotted time.

TABLE 12

| Electrical Stability @ 120° F., volts | 48 Hour Static Aged 456 | | | |
|---|---|---|---|---|
| | 40° F. | 100° F. | 120° F. | 150° F. |
| 600 RPM | 105 | 52 | 44 | 36 |
| 300 RPM | 61 | 32 | 28 | 23 |
| 200 RPM | 46 | 25 | 21 | 17 |
| 100 RPM | 30 | 17 | 14 | 12 |
| 6 RPM | 11 | 7 | 6 | 5 |
| 3 RPM | 10 | 7 | 5 | 4 |
| PV | 44 | 20 | 16 | 13 |
| YP | 17 | 12 | 12 | 10 |
| 10-sec Gel | 12 | 9 | 7 | 6 |
| 10-min Gel | 16 | 11 | 9 | 8 |
| 30-min Gel | 18 | 6 | 8 | 6 |

TABLE 13

| Electrical Stability @ 120° F., volts | 72 Hour Static Aged 479 | | | |
|---|---|---|---|---|
| | 40° F. | 100° F. | 120° F. | 150° F. |
| 600 RPM | 99 | 50 | 43 | 36 |
| 300 RPM | 57 | 31 | 27 | 22 |
| 200 RPM | 42 | 24 | 20 | 16 |
| 100 RPM | 27 | 16 | 13 | 11 |
| 6 RPM | 10 | 6 | 5 | 4 |
| 3 RPM | 9 | 6 | 5 | 4 |
| PV | 42 | 19 | 16 | 14 |
| YP | 15 | 12 | 11 | 8 |
| 10-sec Gel | 10 | 7 | 6 | 6 |
| 10-min Gel | 13 | 9 | 8 | 6 |
| 30-min Gel | 15 | 7 | 7 | 5 |

TABLE 14

| Electrical Stability @ 120° F., volts | 168 Hour Static Aged 358 | | | |
|---|---|---|---|---|
| | 40° F. | 100° F. | 120° F. | 150° F. |
| 600 RPM | 93 | 48 | 41 | 34 |
| 300 RPM | 54 | 30 | 25 | 20 |
| 200 RPM | 41 | 22 | 18 | 15 |
| 100 RPM | 26 | 15 | 12 | 10 |
| 6 RPM | 10 | 6 | 4 | 4 |
| 3 RPM | 9 | 5 | 4 | 3 |
| PV | 39 | 18 | 16 | 14 |
| YP | 15 | 12 | 9 | 6 |
| 10-sec Gel | 11 | 6 | 5 | 5 |
| 10-min Gel | 14 | 7 | 6 | 5 |
| 30-min Gel | 15 | 7 | 5 | 4 |

As shown by the data in these tables, the IR drilling fluids have excellent thermal stability after 7 days at 250° F., which indicates excellent downhole stability. Furthermore, the IR drilling fluid systems are easy to maintain and can be recycled and re-used. Moreover, the IR drilling fluid systems are solids tolerant drilling fluids with excellent particle suspension across temperature and pressure which minimizes sag. The solid tolerance of one embodiment of the IR drilling fluid was determined with a stress test with results shown in Table 15 below. The rheological properties of the IR drilling fluid were affected by the simulated drill solid (Rev Dust), but not significantly. The fluid was still stable and the change was minimal. With slight treatment, most properties are easily recovered.

TABLE 15

| | IR Drilling Fluid, 12.0 ppg | | | | Contaminated with 5% Rev Dust | | | |
|---|---|---|---|---|---|---|---|---|
| | Rheology Results: | | | | | | | |
| | ROLLED @ 150° F. | | | | ROLLED @ 150° F. | | | |
| | Rheology Temp. @ | | | | | | | |
| | 40° F. | 100° F. | 120° F. | 150° F. | 40° F. | 100° F. | 120° F. | 150° F. |
| Electrical Stability, volts | 460 | | | | 508 | | | |
| 600 rpm reading | 121 | 66 | 57 | 49 | 151 | 81 | 64 | 52 |
| 300 rpm reading | 71 | 43 | 36 | 31 | 89 | 49 | 38 | 32 |
| 200 rpm reading | 53 | 34 | 28 | 24 | 67 | 38 | 29 | 24 |
| 100 rpm reading | 34 | 24 | 20 | 16 | 44 | 25 | 20 | 15 |
| 6 rpm reading | 12 | 11 | 9 | 8 | 14 | 8 | 7 | 6 |
| 3 rpm reading | 11 | 11 | 8 | 7 | 12 | 7 | 6 | 6 |
| Plastic viscosity, cP | 50 | 23 | 21 | 18 | 62 | 32 | 26 | 20 |
| Yield point, lb/100 ft$^2$ | 21 | 20 | 15 | 13 | 27 | 17 | 12 | 12 |
| 10-sec Gel, lb/100 ft$^2$ | 14 | 14 | 12 | 11 | 13 | 10 | 9 | 9 |
| 10-min Gel, lb/100 ft$^2$ | 21 | 19 | 14 | 9 | 17 | 18 | 15 | 13 |
| 30-min Gel, lb/100 ft$^2$ | 27 | 17 | 13 | 12 | 20 | 18 | 13 | 11 |

The common industry standard for flat rheology drilling fluids is <20% variation in YP between 40° F. and 150° F., measured at atmospheric pressure. These flat rheology drilling fluids include minimum amounts of organophilic clay and a compensating amount of rheology modifier. It has been demonstrated, however, that constant rheology at atmospheric pressure does not provide constant downhole rheology. The rheological properties of these flat rheology fluids change downhole because the downhole pressure overcorrects the thinning effect of the downhole temperature.

The IR drilling fluids allow more variation in the rheological properties at atmospheric pressure (i.e., larger YP variance and larger LSYP variance at atmospheric temperature), but provide more constant downhole rheology properties (i.e., smaller LSYP variance at HTHP and/or across the TP combination set for the representative well or a particular wellbore). The more constant downhole rheological properties provide significantly improved generated ECD values. The downhole fluid behavior of drilling fluids was found to be sensitive to not only the dosage of the additives (e.g., organophilic clay, rheology modifier), but also the relative amounts of each (i.e., ratios) because each additive responds differently to temperature and pressure.

Figure 8:
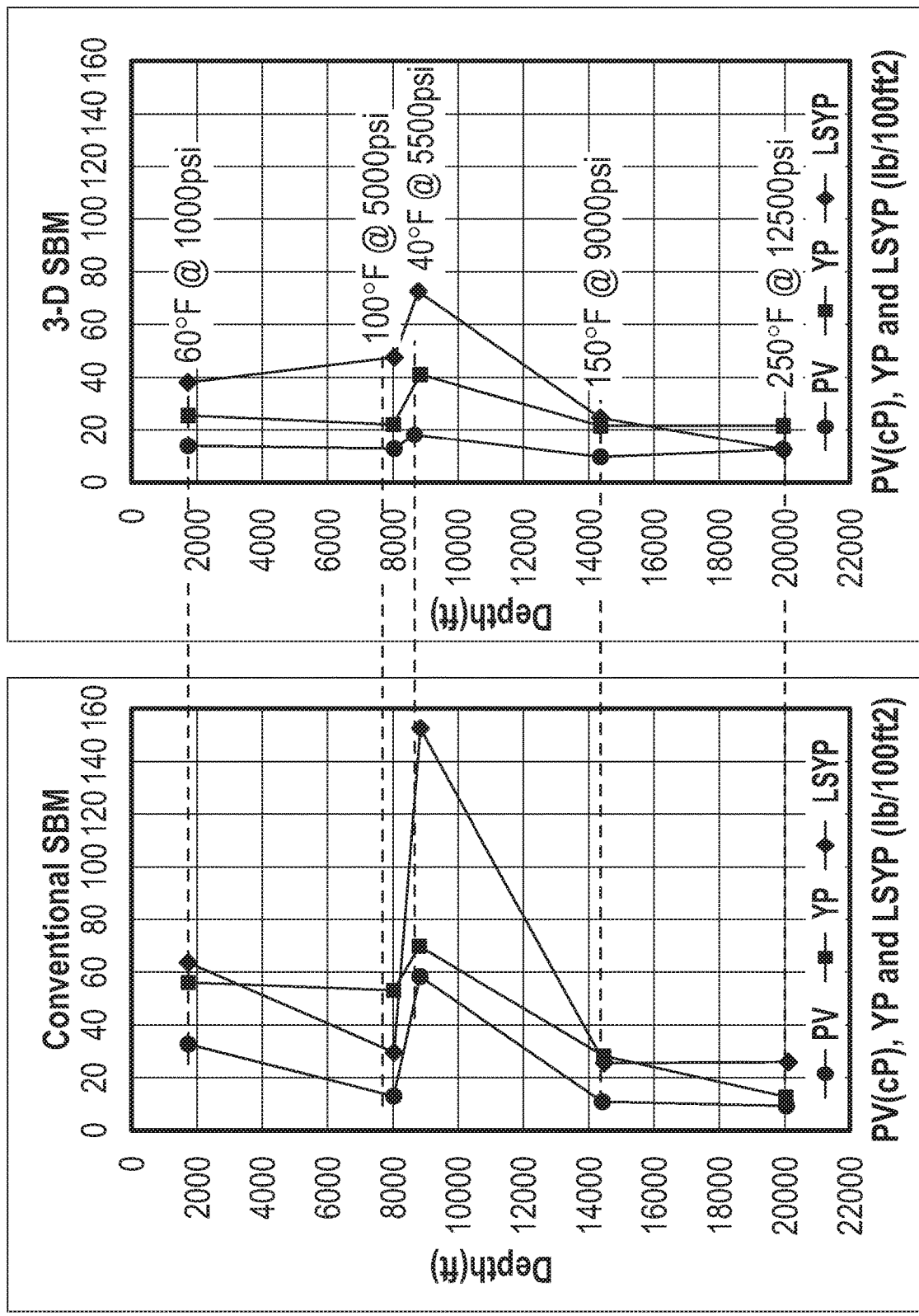
FIG. 8 is a comparison of the PV, YP, and LSYP values for an IR drilling fluid and a conventional flat rheology drilling fluid.

The rheological behavior of drilling fluids at cold temperatures (e.g., 40° F.) cannot be underestimated. FIG. 8 compares PV, YP, and LSYP values of an IR drilling fluid (3-D SBM) and a conventional drilling mud (conventional SBM) under shut-in conditions (i.e., no circulation). The temperature and pressure are marked along with depth. At 40° F. and 5500 psi, the IR drilling fluid had significantly lower YP and LSYP than the conventional drilling fluid. Long-term gel strength was also investigated, and it was confirmed that the IR drilling fluid has non-progressive gels (over 1-hr).

A method of drilling a wellbore through a subterranean formation includes providing an IR drilling fluid as described herein, and pumping the IR drilling fluid through a drill string disposed within the wellbore. The IR drilling fluid may circulate down through the drill string, and return to the surface through the annulus around the drill string. The IR drilling fluid may carry drill cuttings produced by the drill bit to the surface of the wellbore. The IR drilling fluid may also be used in the process of running and cementing casing.

In another embodiment, the IR drilling fluid may have a ratio of viscosifier to rheology modifier that provides optimum rheological properties at the circulating conditions in a target well. The ratio may be less than 6 or greater than 14. A method is disclosed herein for selecting the formulation of a selected IR drilling fluid for use in the target well. The method includes first defining a temperature and pressure condition profile (TP condition profile) including a temperature and pressure condition (TP condition) for each of a plurality of depths in the target well. Each TP condition includes a circulating temperature value and a pressure value of the drilling fluid in an annulus at the corresponding depth in the target well. The TP condition profile for the target well may be defined based on actual measurements or estimations or simulations for the specific target well. Alternatively, the TP condition profile for the target well may be defined based on data from a representative well, such as a well having a similar depth in a similar location (e.g., a well in the Gulf of Mexico with a depth of about 20,000 feet below the mudline and a sea depth of about 9,000).

The selection method further includes preparing a test IR drilling fluid set including two or more test IR drilling fluids each including a continuous phase consisting of an olefin base fluid, an internal phase consisting of an aqueous solution having one or more solutes in a concentration of about 20 to about 30 weight percent of the aqueous solution, an emulsifier, a polymeric rheology modifier in an amount of about 0.1 to about 2 pounds per barrel, a viscosifier comprising an organophilic clay in an amount of about 0.2 to about 10 pounds per barrel. Each test drilling fluid has a unique value of the weight ratio of the amount of the viscosifier to the amount of the polymeric rheology modifier.

One or more rheological properties are measured for each of the test IR drilling fluids at each TP condition. The rheological properties measured include at least shear stress, which is measured at various rates at each TP condition for the test well using a Fann® iX77 HPHT Rheometer. An LSYP value is calculated for each of the test IR drilling fluids at each TP condition. The LSYP value is calculated by subtracting the dial reading at 6 rpm from twice the dial reading at 3 rpm. An LSYP variance is then calculated for each of the test IR drilling fluids across the TP conditions based on the dial readings. The LSYP variance is calculated using the formula:

$$LSYP \text{ variance} = \frac{(LSYP_{Max} - LSYP_{Min})}{LSYP_{Min}} * 100\%$$

Where $LSYP_{Min}$ is the lowest LSYP value for the fluid across the temperatures and $LSYP_{Max}$ is the greatest LSYP value for the fluid across the temperatures. One of the test IR drilling fluids having an LSYP variance below 60 percent is selected and provided for use in the target well.

Each assembly described in this disclosure may include any combination of the described components, features, and/or functions of each of the individual assembly embodiments. Each method described in this disclosure may include any combination of the described steps in any order, including the absence of certain described steps and combinations of steps used in separate embodiments. Any range of numeric values disclosed herein shall be construed to include any subrange therein.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

We claim:

1. A drilling fluid with improved rheology under downhole conditions, comprising:
    a continuous phase consisting of a paraffin, an olefin, a mineral oil, an ester, or a mixture of any combination thereof;
    an internal phase consisting of an aqueous solution having one or more solutes in a concentration of about 10 to about 40 weight percent of the aqueous solution;
    an emulsifier;
    a polymeric rheology modifier in an amount of about 0.05 to about 2 pounds per barrel;
    a viscosifier comprising an organophilic clay in an amount of about 0.3 to about 20 pounds per barrel;
    wherein an LSYP variance of the drilling fluid is below 60 percent, wherein $$LSYP \text{ variance} = \frac{(LSYP_{Max} - LSYP_{Min})}{LSYP_{Min}} * 100\%$$

wherein $LSYP_{Min}$ is a lowest LSYP value in an LSYP value set for the drilling fluid and $LSYP_{Max}$ is a greatest LSYP value in the LSYP value set, wherein the LSYP value set consists of an LSYP value measured at a plurality of TP conditions along the depth of a representative wellbore, wherein each TP condition includes a circulating temperature value and a pressure value in an annulus at the corresponding depth.

2. The drilling fluid of claim 1, wherein the plurality of TP conditions consists of:
    about 65° F. and about 15 psi,
    about 65° F. and about 1,800 psi, about 100° F. and about 5,100 psi,
about 150° F. and about 9,000 psi, and
about 150° F. and about 12,700 psi.

3. The drilling fluid of claim 1, wherein a YP variance of the drilling fluid is below 60 percent, wherein $$YP \text{ variance} = \frac{(YP_{Max} - YP_{Min})}{YP_{Min}} * 100\%$$

wherein $YP_{Min}$ is a lowest YP value in a YP value set for the drilling fluid and $YP_{Max}$ is a greatest YP value in the YP value set, wherein the YP value set consists of a YP value measured at the plurality of TP conditions along the depth of the representative wellbore.

4. The drilling fluid of claim 3, wherein a weight ratio of the amount of the viscosifier to the amount of the polymeric rheology modifier is about 6 to about 14.

5. The drilling fluid of claim 4, wherein the amount of the viscosifier in the drilling fluid is about 1.5 to about 3 pounds per barrel.

6. A drilling fluid with improved rheology under downhole conditions, comprising:
   a continuous phase consisting of a paraffin, an olefin, a mineral oil, an ester, or a mixture of any combination thereof;
   an internal phase consisting of an aqueous solution having one or more solutes in a concentration of about 10 to about 40 weight percent of the aqueous solution;
   an emulsifier;
   a polymeric rheology modifier; and
   a viscosifier comprising an organophilic clay;
   wherein a weight ratio of the amount of the viscosifier to the amount of the polymeric rheology modifier is about 6 to about 14 and wherein an LSYP variance of the drilling fluid is below 60 percent, wherein $$LSYP \text{ variance} = \frac{(LSYP_{Max} - LSYP_{Min})}{LSYP_{Min}} * 100\%$$

wherein $LSYP_{Min}$ is a lowest LSYP value in an LSYP value set for the drilling fluid and $LSYP_{Max}$ is a greatest LSYP value in the LSYP value set, wherein the LSYP value set consists of an LSYP value measured at each of the temperature and pressure combinations in a TP combination set consisting of:
   about 65° F. and about 15 psi,
   about 65° F. and about 1,800 psi,
   about 100° F. and about 5,100 psi,
   about 150° F. and about 9,000 psi, and
   about 150° F. and about 12,700 psi.

7. A method of drilling a wellbore through a subterranean formation, comprising the steps of:
   a) providing a drilling fluid comprising: a continuous phase consisting of a paraffin, an olefin, a mineral oil, an ester, or a mixture of any combination thereof; an internal phase consisting of an aqueous solution having one or more solutes in a concentration of about 10 to about 40 weight percent of the aqueous solution; an emulsifier; a polymeric rheology modifier in an amount of about 0.05 to about 2 pounds per barrel; a viscosifier comprising an organophilic clay in an amount of about 0.3 to about 20 pounds per barrel; wherein an LSYP variance of the drilling fluid is below 60 percent, wherein $$LSYP \text{ variance} = \frac{(LSYP_{Max} - LSYP_{Min})}{LSYP_{Min}} * 100\%$$

wherein $LSYP_{Min}$ is a lowest LSYP value in an LSYP value set for the drilling fluid and $LSYP_{Max}$ is a greatest LSYP value in the LSYP value set, wherein the LSYP value set consists of an LSYP value measured at a plurality of TP conditions along the depth of the wellbore, wherein each TP condition includes a circulating temperature value and a pressure value in an annulus at the corresponding depth; and
   b) pumping the drilling fluid through a drill string disposed within the wellbore.

8. The method of claim 7, wherein a weight ratio of the amount of the viscosifier to the amount of the polymeric rheology modifier is about 6 to about 14.

9. The method of claim 7, wherein a weight ratio of the amount of the viscosifier to the amount of the polymeric rheology modifier is about 8 to about 12.

10. The method of claim 7, wherein a weight ratio of the amount of the viscosifier to the amount of the polymeric rheology modifier is about 10.

11. A method of selecting a drilling fluid for a well, comprising the steps of:
   a) defining a TP condition profile including a TP condition for each of a plurality of depths in a target well, and wherein each TP condition includes a circulating temperature value and a pressure value of a drilling fluid in an annulus at the corresponding depth in the target well;
   b) preparing a test drilling fluid set including two or more test drilling fluids; wherein each test drilling fluid includes a continuous phase consisting of a paraffin, an olefin, a mineral oil, an ester, or a mixture of any combination thereof; an internal phase consisting of an aqueous solution having one or more solutes in a concentration of about 10 to about 40 weight percent of the aqueous solution; an emulsifier; a polymeric rheology modifier in an amount of about 0.05 to about 2 pounds per barrel; a viscosifier comprising an organophilic clay in an amount of about 0.3 to about 20 pounds per barrel; wherein each test drilling fluid has a unique value of a weight ratio of the amount of the viscosifier to the amount of the polymeric rheology modifier;
   c) measuring one or more rheological properties of each of the test drilling fluids at each TP condition, wherein the rheological properties include at least a dial reading, wherein the dial reading is measured at various shear rates at each TP condition using an HTHP viscometer;
   d) calculating an LSYP value for each test drilling fluid at each TP condition;
   e) calculating an LSYP variance of each of the test drilling fluids across the TP conditions, wherein the LSYP variance is calculated using the formula:

$$LSYP \text{ variance} = \frac{(LSYP_{Max} - LSYP_{Min})}{LSYP_{Min}} * 100\%$$

wherein $LSYP_{Min}$ is a lowest LSYP value at any of the TP conditions for the test drilling fluid and $LSYP_{Max}$ is a greatest LSYP value at any of the TP conditions for the test drilling fluid; and f) providing a selected drilling fluid for use in the well, wherein the selected drilling fluid is one of the test drilling fluids having an LSYP variance below 60 percent.

* * * * *